INVENTOR.
ROBERT A. PALMORE

BY

Ralph B. Brick
ATTORNEY

March 16, 1965 R. A. PALMORE 3,173,776
DUST COLLECTOR
Filed March 30, 1962 2 Sheets-Sheet 2
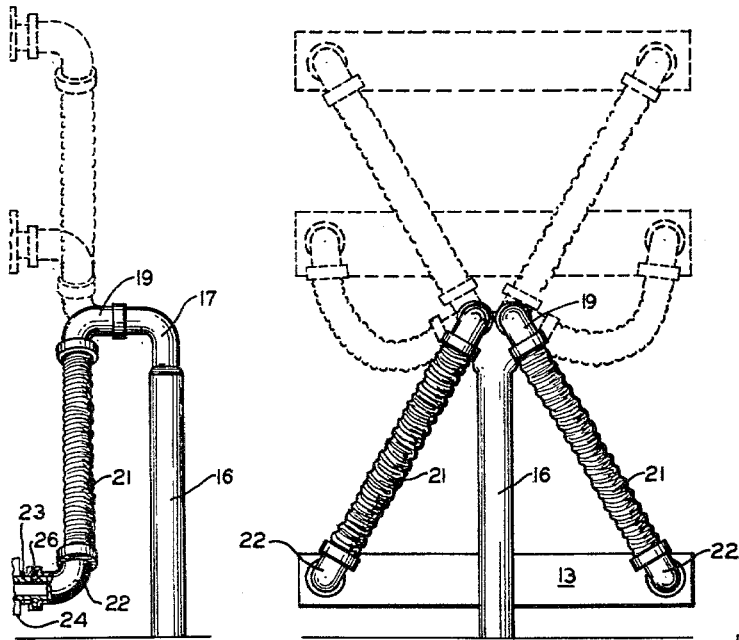
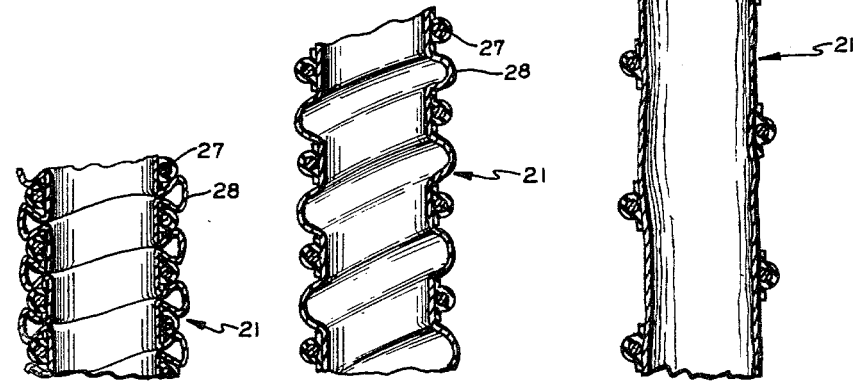
INVENTOR.
ROBERT A. PALMORE
BY
Ralph B. Brick
ATTORNEY

United States Patent Office 3,173,776
Patented Mar. 16, 1965

3,173,776
DUST COLLECTOR
Robert A. Palmore, Louisville, Ky., assignor to American Air Filter Company, Inc., Louisville, Ky., a corporation of Delaware
Filed Mar. 30, 1962, Ser. No. 183,862
1 Claim. (Cl. 55—294)

The present invention relates to dust collectors of the gas permeable tubular fabric type and more particularly to an improved secondary air system for dislodging contaminant particles collected on the interior surfaces of the tubes of such collectors.

It long has been known in the art of dust collection to pass a dirty gas stream through one or more gas permeable filter tubes extending between a supply header and a dust hopper, the gas to be cleaned flowing from the header through the walls of the filter tubes with contaminant particles in the gas depositing on the interior surfaces of the tubes or falling into the hopper. To remove dust deposited on the interior surfaces of the tubes, reverse blow ring means is arranged to traverse the tubes periodically, the blow ring means directing a stream of secondary air against the exterior surfaces of the tubes to dislodge contaminants collected on the interior tube surfaces.

Various arrangements have been utilized in the past for conducting secondary air to the reverse blow ring means. These past arrangements have included rigid vertical air supply columns mounted adjacent the gas permeable tubes to extend along part or all of the length thereof, the supply columns being connected to the blow ring means by flexible hose. The flexible hose which has been used has been lengthy and cumbersome, has created undue pressures, and movement thereof has tended to interfere with tube cleaning operations. To avoid these disadvantages other costly and complex arrangements, not dependent upon flexible hose, have been utilized.

In accordance with the present invention, flexible hose from the air supply to the blow ring means is once again utilized but the past disadvantages associated therewith are avoided, the present invention providing a flexible hose arrangement in the secondary air supply system that has a minimum of pressure loss during the entire operational period, that is economical to install and maintain, that occupies a minimum of space, and that maintains a preselected path of movement during operations so as not to interfere with the gas permeable tubes of the cleaning apparatus, or to come in wearing contact with the collector housing.

Various other features of the present invention will become obvious to one skilled in the art upon reading the disclosure set forth herein.

More particularly, the present invention provides a dust collector comprising a housing having spaced dirty gas inlet means and clean gas outlet means, vertically extending gas permeable tube means disposed within the housing in communication with the dirty gas inlet means whereby dirty gas can be introduced into and passed through the tube means to separate contaminant particles therefrom, reverse blow ring frame means adapted to longitudinally traverse the tube means, a clean air supply conduit means having an outlet adjacent the gas cleaning tube means, and flexible hose means connecting the outlet of the clean air supply conduit means with the reverse blow ring means, the flexible hose means being longitudinally compressible-expansible to occupy a minimum of space when the blow ring frame means passes a position adjacent the clean air supply conduit outlet. In addition, the present invention provides a novel arrangement for mounting the flexible hose means in order to maintain the hose means in a preselected path during its movement with the blow ring means to which it is attached so as not to interfere with the gas permeable tube means which the blow ring means services and so as to avoid wear which would otherwise occur upon contact of the hose with other parts.

It is to be understood that various changes can be made by one skilled in the art in the arrangement, form and construction of the apparatus disclosed herein without departing from the scope or spirit of the present invention.

Referring to the drawings which disclose one advantageous embodiment of the present invention:

FIGURE 2 is a schematic elevational view disclosing the secondary air system of FIGURE 1 in extreme and intermediate positions;

FIGURE 3 is a schematic side elevational view of the structure of FIGURE 2;

FIGURE 4 is a cross-sectional view of a portion of a flexible hose of FIGURES 1-3 in compressed condition;

FIGURE 5 is a cross-sectional view of the hose portion of FIGURE 4 in semi-extended condition; and FIGURE 6 is a cross-sectional view of the hose portion of FIGURES 4 and 5 in fully extended condition.

Figure 1:
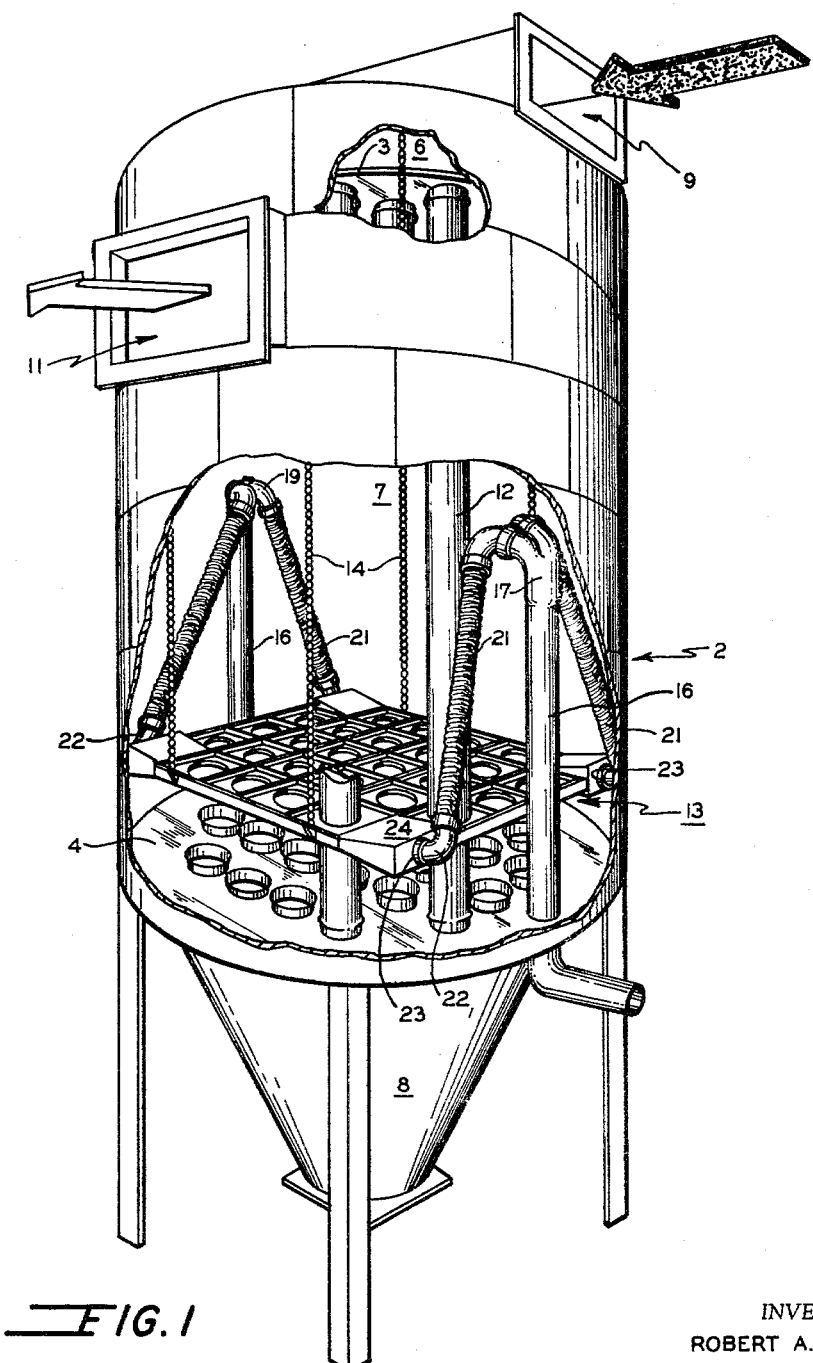
FIGURE 1 is an overall partially broken away perspective view of a tubular type dust collector incorporating the improved secondary air system of the present invention.

Referring to FIGURE 1 of the drawings, dust collector housing 2, the main body portion of which advantageously can be of cylindrical form, is disclosed. Arranged to extend transversely across housing 2 in spaced parallel relationship to each other are upper and lower tube header plates 3 and 4, respectively. Tube header plates 3 and 4 divide housing 2 into dirty gas plenum 6 above upper header plates 3, gas treating plenum 7 between spaced header plates 3 and 4, and dust hopper 8 below lower header plate 4. It is to be noted that dirty gas plenum 6 is provided with dirty gas inlet 9 and gas treating plenum 7 is provided with spaced clean gas outlet 11.

Mounted in vertically extending position to connect suitably spaced openings in upper tube header plate 3 with aligned and similarly spaced openings in lower tube header plate 4 are a series of gas pervious fabric tubes 12. Tubes 12 are arranged to pass through apertures in blow ring frame 13, which frame is moved vertically in a periodic manner along the length of the tubes through suitable chain drive mechanism 14 (not shown in detail). As the frame is moved, high pressure air is discharged at certain preselected intervals against the exterior tube surfaces, dislodging dust from the interior surfaces of the tubes, the dislodged dust falling into hopper 8. It is to be understood that the apparatus so far described is, for the most part, similar to that disclosed in assignee's Patent No. 2,776,024, issued to Evans E. Fowler on January 1, 1957. Therefore, such apparatus and the operating mechanism associated therewith is not set forth in detail herein.

In accordance with the present invention, a novel arrangement is provided for supplying secondary air to blow ring frame 13. This arrangement includes a pair of clean air supply riser conduits 16 mounted to project vertically upward from lower tube header plate 4 in spaced relationship on either side of blow ring frame 13. Each of conduits 16 is connected at its lower end to a suitable high pressure air supply source (not shown) to receive secondary air at preselected intermittent periods during reverse blowing operations. At the opposite end, each conduit 16 terminates in a bifurcated outlet portion 17 to provide a pair of outlets midway between upper and lower tube header plates 3 and 4, respectively. Fastened to each outlet of each outlet portion 17 in such a manner as to permit rotational movement about such outlet is one end of elbow section 19. Fastened to the other end of each elbow section 19 in a similar manner to permit rotational movement thereabout is one end of flexible hose 21 which hose can be of a suitably selected rubber material, an impregnated fabric, or a composition of both. The opposite end of each hose 21 is fastened to one end of an elbow section 22 for rotational movement thereabout. In turn, the opposite end of each elbow section 22 is fastened, for rotational movement thereabout, to outlet coupling 23 of one of four slotted nozzles 24. Slotted nozzles 24 are arranged to communicably connect to the four corners of blow ring frame 13 to deliver high pressure air to the exterior surfaces of tubes 12.

As can be seen in the lower portion of FIGURE 3, to effect the abovedescribed connections in a straightforward and economical manner each end of each elbow section 19 and 22 can be provided with an internal groove which can be aligned with an external groove in the part to which it is connected. A suitable radially compressible-expansible split ring member 26 can then be provided to engage in the aligned grooves to hold the connected parts together and to permit the relative rotational movement.

Referring to FIGURES 4–6 of the drawings, it can be seen that each hose 21 has embedded in its wall a helical spring 27. Each spring 27 is prestressed to urge the hose wall with which it is associated toward a longitudinally compressed condition at a preselected compression pressure which is determined in accordance with the amount of air pressure to be used for reverse blowing. It is to be noted that the wall of each hose 21 includes a helical expansion section 28, the turns of which are interposed between the turns of the helical spring 27 embedded in the wall. Hose 21 is so manufactured that, when spring 27 is in its prestressed compressed condition, the turns of helical expansion section 28 fold intermediate the turns of helical spring 27 in such a manner as to fall along the outside face of the helical spring. As a result, a preselected nominal hose diameter is established when the hose is in precompressed condition, this nominal diameter being maintained when the blow ring frame to which the hose is connected is moved toward the extremes of the tubes and the hose is placed in extended position (FIGURES 5 and 6). Furthermore, because of the manner in which the helical expansion sections are arranged to fold, the internal surface of each hose is maintained sufficiently smooth during the course of hose expansion to allow passage of air with a minimum of pressure loss.

As will be noted in FIGURES 3 and 4 of the drawings, the rotational connections of elbow sections 19 to conduit portions 17 and the rotational connections of elbow sections 22 to blow ring frame coupling portions 23 permits blow ring frame 13 to be moved from one extremity of the tubes to the other with hoses of a length equal to only one-half the length of the tubes. Furthermore, the rotational movement of the hoses about their longitudinal axis which is permitted by the connections at either end of the hoses 21 and the rotational movement of the elbow sections about the axes of one of their legs which is permitted by the connections of the sections 19 and 22 to the conduit risers and the blow ring frame, respectively, serves to avoid any torsional deflection which would otherwise occur in the hoses when these hoses are moved from one position to the other. In effect, the hoses, which would otherwise tend to assume an S-shape contour, remain in a preselected vertical plane during reverse blowing operations, thus avoiding any interference with gas cleaning tubes 12 or wear contact with housing 2 and the other mechanisms disposed therein.

The invention claimed is:
A dust collector comprising:
(a) a housing having spaced dirty gas inlet means and clean gas outlet means;
(b) vertically extending gas cleaning tube means disposed within said housing in communication with said dirty gas inlet means and said clean gas outlet means whereby dirty gas can be introduced from said dirty gas inlet means into and passed through said tube means to separate contaminant particles therefrom with the clean gas passing to said clean gas outlet means;
(c) reverse blow ring frame means adapted to longitudinally traverse said tube means;
(d) said reverse blow ring frame means including an inlet opening to receive clean air for reverse blowing operations;
(e) a clean air supply conduit means having an outlet positioned intermediate the ends of said gas cleaning tube means;
(f) a first elbow member rotatably connected at one end to said inlet opening of said blow ring frame means in such a manner as to permit rotational movement of said elbow member about the longitudinal axis of its leg at such end of said elbow member;
(g) a second elbow member rotatably connected at one end to said outlet of said clean air supply conduit in such a manner as to permit rotational movement of said second elbow member about the longitudinal axis of its leg at such end of said elbow member;
(h) a flexible hose extending between and rotatably connected at its opposite ends to the other legs of said elbow members in such a manner as to permit rotational movement of said hose about its longitudinal axis at such ends of connection thus avoiding torsional deflection of said hose when moved from one position to another;
(i) said flexible hose being longitudinally compressible-expansible to occupy a minimum of space when said blow ring frame means passes a position adjacent said outlet of said clean air supply, said flexible hose including a helical expansion section and a prestressed helical compression spring longitudinally disposed therein with turns of said expension section interposed between turns of said spring, the turns of said expansion section of said hose being arranged to fold along the outside face of said spring when said hose is in compressed conditions so that a preselected nominal diameter of said hose is maintained throughout operational periods;
(j) the longitudinal axis of said hose member and the longitudinal axes of the legs of said elbow members to which said hose is connected lying in a common plane substantially parallel to the longitudinal axis of said tube means.

References Cited by the Examiner
UNITED STATES PATENTS

| | | | |
|---|---|---|---|
| 2,661,079 | 12/53 | Osgood et al. | 55—294 |
| 2,890,264 | 6/59 | Duff | 138—122 |
| 2,954,802 | 10/60 | Duff | 138—122 |
| 2,961,007 | 11/60 | Martin | 138—122 |

HARRY B. THORNTON, *Primary Examiner.*
HERBERT L. MARTIN, *Examiner.*